United States Patent [19]

Saito et al.

[11] Patent Number: 4,957,995

[45] Date of Patent: Sep. 18, 1990

[54] LOW-VISCOSITY EPOXY RESIN, AND FIBER-REINFORCED COMPOSITE MATERIAL BASED ON M-ALKYL TRIGLYCIDYLAMINOPHENOLS

[75] Inventors: Yasuhisa Saito, Higashiosaka; Katsuya Watanabe, Takatsuki; Kohichi Okuno, Izumiotsu; Kunimasa Kamio, Suita; Akira Morii, Ibaraki, all of Japan

[73] Assignee: Sumitomo Chemical Company, Limited, Osaka, Japan

[21] Appl. No.: 402,663

[22] Filed: Sep. 5, 1989

Related U.S. Application Data

[60] Division of Ser. No. 174,703, Mar. 29, 1988, Pat. No. 4,900,848, which is a continuation-in-part of Ser. No. 96,210, Sep. 8, 1987, abandoned, which is a continuation of Ser. No. 909,582, Sep. 22, 1986, abandoned.

[30] Foreign Application Priority Data

| Sep. 27, 1985 | [JP] | Japan | 60-216044 |
| Jan. 10, 1986 | [JP] | Japan | 61-3860 |
| Feb. 7, 1986 | [JP] | Japan | 61-26601 |
| Feb. 7, 1986 | [JP] | Japan | 61-26602 |
| Feb. 7, 1986 | [JP] | Japan | 61-26603 |

[51] Int. Cl.$^5$ .................. C08G 59/10; C08G 59/32
[52] U.S. Cl. ............................ 528/99; 549/552; 525/113; 525/396; 525/423; 525/438; 525/449; 525/463; 525/471; 525/476; 525/481; 525/482; 525/483; 525/484; 525/526; 525/534; 525/535; 525/537; 428/413
[58] Field of Search ............ 549/552; 528/99; 525/113, 396, 423, 438, 449, 463, 471, 476, 481, 482, 483, 484, 526, 534, 535, 537; 428/413

[56] References Cited

U.S. PATENT DOCUMENTS

| 2,951,822 | 9/1960 | Reinking | 528/99 |
| 2,951,825 | 9/1960 | Reinking | 528/99 |

FOREIGN PATENT DOCUMENTS

| 0103392 | 3/1984 | European Pat. Off. |
| 55-69616 | 5/1980 | Japan . |
| 55-92757 | 7/1980 | Japan . |
| 59-217721 | 12/1984 | Japan . |
| 62-1717 | 1/1987 | Japan . |
| 62-1719 | 1/1987 | Japan . |

OTHER PUBLICATIONS

C.A. 107:34500f
C.A. 106:205281w
C.A. 108:205745s
C.A. 109:7521y
C.A. 109:75222
C.A. 108:222579h
Database WPIL, No. 76-15917x, Derwent Publications Ltd., London, GB.

*Primary Examiner*—John Kight, III
*Assistant Examiner*—Frederick Krass
*Attorney, Agent, or Firm*—Stevens, Davis, Miller & Mosher

[57] ABSTRACT

A low viscosity epoxy resin, i.e., a low viscosity polyglycidyl derivative, of an aminophenol having at least one alkyl group on its aromatic ring of which viscosity is 15 poises or below as measured at 25° C., a resin composition containing said resin, and a fiberreinforced composite material containing as matrix a cured product of said epoxy resin composition and a fiber as reinforcing material.

26 Claims, No Drawings

LOW-VISCOSITY EPOXY RESIN, AND FIBER-REINFORCED COMPOSITE MATERIAL BASED ON M-ALKYL TRIGLYCIDYLAMINOPHENOLS

This is a division of application Ser. No. 07/174,703, now U.S. Pat. No. 4,900,848 filed Mar. 29, 1988, which in turn is a continuation-in-part of application Ser. No. 096,210, filed Sept. 8, 1987, abandoned, which in turn is a continuation of application Ser. No. 06/909,582, filed Sept. 22, 1986, abandoned.

BACKGROUND OF THE INVENTION 1. Field of the Invention

The present invention relates to a low-viscosity epoxy resin, a resin composition containing said resin, and a fiber-reinforced composite material containing a cured product of said composition as matrix. 2. Description of the Prior Art Having excellent curability, heat resistance, mechanical properties, adhesive property and bonding property, epoxy resins are extensively in use. One of the uses of epoxy resin is its use in the electric and electronic fields, and another is lamination and composite materials mainly in airplanes. In these fields, more and more improved performances are required currently.

That is, on the one hand, improvements in heat resistance and in mechanical properties at high temperature and high humidity are required. On the other hand, a low viscosity of resin is required from the viewpoint of workability in the impregnation of epoxy resin into fiber material for making a prepreg. Although single nucleus type aromatic epoxy resins are hopeful as an epoxy resin fulfilling the above-mentioned requirements, none of the existing epoxy resins can fulfil all the requirements mentioned above.

In view of above, the present inventors have conducted elaborated studies on an epoxy resin which is excellent in heat resistance and mechanical properties at high temperature and high humidity and has a low viscosity. As the results, there has been found a method for easily producing epoxy resins (polyglycidyl derivatives) which satisfy all the above-mentioned requirements. Based on this finding, the present invention has been accomplished.

Apart from above, fiber-reinforced composite materials containing a cured epoxy resin composition as matrix and a fiber such as carbon fiber, alumina fiber, polyamide fiber or the like as reinforcing material are in use as structural materials for various industries and as sports goods, leisure goods and the like owing to their excellent mechanical properties.

However, with the expansion of the application field of composite material in the recent time, there has become desired a material which retains its excellent chemical stability and mechanical properties even under more severe conditions, i.e. higher temperature and higher humidity, than ever.

The resin used as matrix is important from the viewpoint of making a fiber-reinforced composite material exhibiting the characteristic properties of reinforcing fiber to the greatest extent. Accordingly, development of fiber-reinforced composite material using various epoxy resin compositions as matrix has actively been studied, For example, in Japanese Patent Publication No. 25,217/80, there is proposed a carbon fiber-reinforced composite material comprising an epoxy resin composed of N,N,N',N'-tetraglycidylaminodiphenylmethane and the like and diphenyldiaminosulfone as the matrix. Although this composite material has a high interlaminar shear strength and a high heat resistance, its cured product is small in elongation and therefore is hard and brittle. In addition, it is not resistant to thermal shock. Accordingly, it is not satisfactory when put to special uses such as airplanes. Further, a mixture consisting of N,N,N',N'-tetraglycidyldiaminodiphenylmethane and diphenyldiaminosulfone has a viscosity as high as 500 poises or above at 50° C., so that it is difficult to handle at room temperature. Further, the mixture is poor in reactivity and its curing reaction can sufficiently be completed only by after-curing it at a high temperature of 180° C. or above for a period of at least four hours. If boron trifluoride-monoethylamine complex or boron trifluoride-piperazine complex is added as a curing accelerator to this composition in order to overcome the above-mentioned fault, its reactivity may be improved. However, heat resistance of the composition is deteriorated by its addition. On the other hand, regarding the improvement of flexibility, addition of a reactive elastomer may be possible. However, it has been found that its addition markedly deteriorates heat resistance and bending strength of the composition.

As the epoxy resin which can be put to the above-mentioned uses, there are also known, for example, Bisphenol A diglycidyl ether type epoxy resin excellent in adhesion to carbon fiber and the like, its pre-polymer with diaminodiphenylsulfone (DDS) and the like, phenolnovolac and cresol-novolac type epoxy resins, triglycidylaminophenol, and mixtures thereof.

However, these resin compositions are also disadvantageous in the following points. Thus, the prepolymer prepared from Bisphenol A diglycidyl ether type epoxy resin and DDS is disadvantageous in that it has too high a curing temperature and its molded products involve a great residual stress and often involve a defect. Triglycidylaminophenol is disadvantageous in that it is poor in water-resistance and its flexibility, interlaminar shear strength and bending strength are unsatisfactory and must be further improved. Apart from above, there is also proposed a resin composition prepared by combining Bisphenol A diglycidyl ether type epoxy resin with dicyandiamide (curing agent) and a curing accelerator. However, such a combination brings about a marked decrease in the heat resistance of cured product. Thus, an epoxy resin of which heat resistance is not greatly deteriorated even if combined with those curing agent and curing accelerator is desired.

The present inventors have conducted elaborated studies with the aim of achieving the above-mentioned objects. As the result, the aimed resin composition and fiber-reinforced composite material have been found. Based on these findings, the present invention has been accomplished.

SUMMARY OF THE INVENTION

It is an object of the present invention to provide a low-viscosity epoxy resin and a process to prepare it.

It is another object of the present invention to provide an epoxy resin composition comprising the epoxy resin described above and an epoxy curing agent.

It is yet another object of the present invention to provide a fiber-reinforced composite material having a high interlaminar shear strength, a high heat resistance and an improved flexibility which contains a cured product of an epoxy resin composition comprising, as its indispensable components, the epoxy resin described above and an epoxy curing agent or the epoxy resin, a specified epoxy resin other than the former and an epoxy curing agent as the matrix and contains a fiber as the reinforcing material.

DETAILED DESCRIPTION OF THE INVENTION

According to the present invention, there is provided a method for producing epoxy resins comprising reacting an aminophenol represented by the following general formula (I) with an epihalohydrin, as well as epoxy resin obtained by said method, particularly a low viscosity epoxy resin:

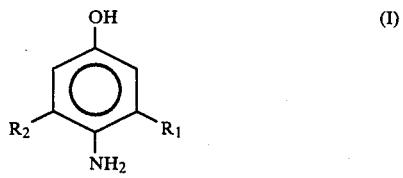

(I)

($R_1$ represents a hydrogen atom or an alkyl group of 1-4 carbon atoms, and $R_2$ represents an alkyl group of 1-4 carbon atoms.).

According to the present invention, there is also provided a method for producing an epoxy resin composition comprising mixing an epoxy resin obtained by reacting an aminophenol represented by the general formula (I) with an epihalohydrin and a curing agent, as well as an epoxy resin composition obtained by said method.

According to the present invention, there is further provided a fiber-reinforced composite material which comprises a cured product of an epoxy resin composition containing, as its indispensable components, a polyglycidyl derivative of the aminophenol represented by the general formula (I) and an epoxy curing agent as matrix and a fiber as reinforcing material.

According to the present invention, there is furthermore provided a heat-resistant composite material which comprises a cured product of an epoxy resin composition comprising, as its indispensable components, (A) a polyglycidyl derivative of the aminophenol represented by the general formula (I)
(B) N,N,N',N'-tetraglycidylbis(aminophenyl)-methane and/or its condensation product, and
(D) an epoxy curing agent
as matrix and a fiber as reinforcing material.

According to the present invention, there is still furthermore provided a fiber-reinforced composite material which comprises a cured product of an epoxy resin composition comprising, as its indispensable components, (A) a polyglycidyl derivative of the aminophenol represented by the general formula (I)
(C) phenol novolac type epoxy resin, cresol novolac type epoxy resin and/or Bisphenol A diglycidyl ether type epoxy resin, and
(D) an epoxy curing agent
as matrix and a fiber as reinforcing material.

The process for producing an epoxy resin of the present invention is characterized in that an aminophenol represented by the general formula (I) as mentioned above is used in a process for reacting an aminophenol with an epihalohydrin. For example, the process comprises subjecting an aminophenol represented by the general formula (I) to addition reaction of the amino group with a large excess of an epihalohydrin at 20° to 100° C., and then to epoxidization at 40° to 100° C. under a reduced pressure while adding an aqueous alkaline hydroxide solution and distilling off water formed in the reaction system simultaneously.

The amount of epihalohydrin to be used in the present invention is 3 moles or more, preferably 10 moles or more per 1 mole of the aminophenol.

The epihalohydrin includes epichlorohydrin, epibromohydrin, and the like.

The production of polyglycidyl derivative of the present invention is characterized in that a side reaction other than the epoxidization is significantly inhibited differing from the known epoxidization. Thus, there can be obtained polyglycidyl derivatives having a high epoxy group content and a low viscosity.

Namely, the low viscosity of the triglycidyl derivative of the present invention is mainly attributable to that the content of the component composed of two or more aromatic rings linked together through intermediation of

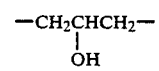

is very low and the content of epoxy group is as high as 90% or more based on theoretical value. Further, the low content of hydroxyl group due to

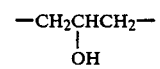

units also contributes to the low viscosity.

Concretely, a polyglycidyl derivative produced in accordance with the above-mentioned reaction condition has a viscosity of 15 poises or below at 25° C., which is very low value as tri-functional polyglycidyl derivatives.

When a non-substituted aminophenol or amino-o-cresol, even if it is a substituted aminophenol, is used, there can be obtained only a polyglycidyl derivative having a very high viscosity. For example, triglycidyl derivative obtained by using non-substituted 4-aminophenol under the above-mentioned condition has a viscosity as high as 40 poises or more at 25° C., and when 4-amino-o-cresol is used the resulting triglycidyl derivative has a viscosity as high as 100 poises or more.

The polyglycidyl derivative of the present invention has three glycidyl groups linked to one aromatic ring.

As is well known, mechanical property of a cured product in wetness at a high temperature is greatly influenced by its water absorption property. Since the cured product obtained from the above-mentioned polyglycidyl derivative has a high crosslinking density, it is low in water absorption and exhibits excellent mechanical properties even in wetness at high temperatures. Further, the polyglycidyl derivative of the present invention has an alkyl group on its aromatic ring, and this alkyl group also contributes to its low water absorption.

The production process of the polyglycidyl derivative of the present invention and the properties of the polyglycidyl derivative obtained by the process are as mentioned above, provided that its production condition is not limited to the above-mentioned one.

As the aminophenol represented by the general formula (I) which is a starting material of triglycidyl derivative used in the present invention, 4-amino-m-cresol and 4-amino-3,5-dimethylphenol are preferable.

The polyglycidyl derivative of the present invention exhibits excellent properties when combined with the existing curing agents. Its particularly important application is the use as a matrix resin for fiber-reinforced laminates and composite materials. In this field, there is an increasing desire currently for the improvement of toughness and flexibility. With this aim, addition of various thermoplastic resins to the prior epoxy resin/curing agent system and a partial or whole replacement of the usual curing agent with various reactive oligomers having a functional group reactive with epoxy group have been attempted. However, such addition or replacement brings about an important problem that the resin system thus obtained is higher than prior resin systems in viscosity and therefore is inferior in impregnating performance.

However, it has been found that by using the low viscosity polyglycidyl derivative of the present invention, it has become possible to co-use the abovementioned thermoplastic resin or a reactive oligomer, since the mixture is sufficiently low in viscosity and can be used in the same manner as in the conventional system. Even in this case, however, the resin, of course, keeps heat resistance and mechanical characteristic properties at wet-high temperature.

As set forth above, a low viscosity polyglycidyl derivative can be very easily obtained according to the method of the present invention. Namely, composite materials excellent in heat resistance, etc., can be easily obtained according to the method of the present invention.

As used herein, the term "reactive oligomer" means an olimoger having, on its molecular and, a functional group such as —OH, —SH, —COOH,

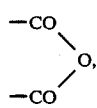

—NH$_2$, —NHR (R represents a lower alkyl group), and the like. Concrete examples of said reactive oligomer include terminal functional group type oligomers having the following structures:

(1) polyaryl ethers such as:

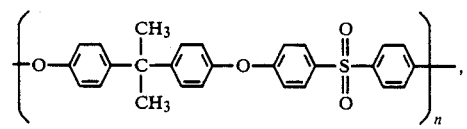

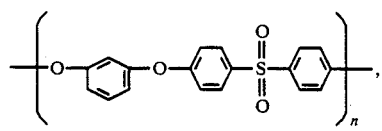

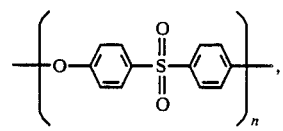

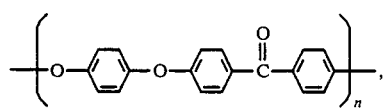

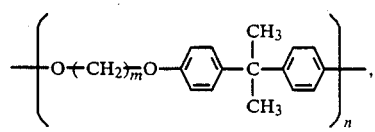

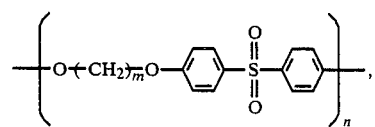

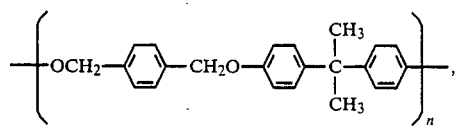

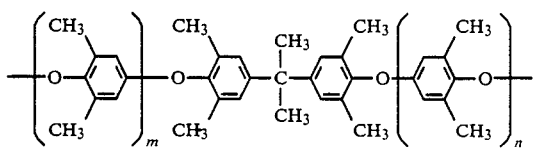

and the like;

(2) polycarbonates such as:

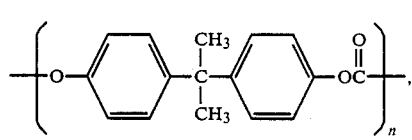

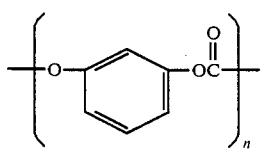

and the like;

(3) polyacrylates such as:

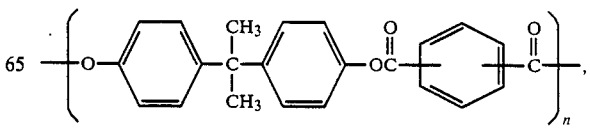

-continued

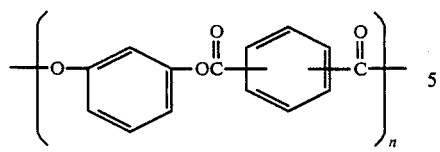

and the like;
(4) polyarylene sulfides such as:

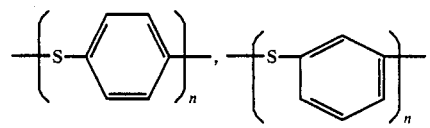

and the like; and
(5) polyimides, polyamide-imides ad polyamides such as:

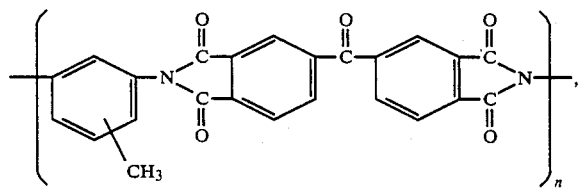

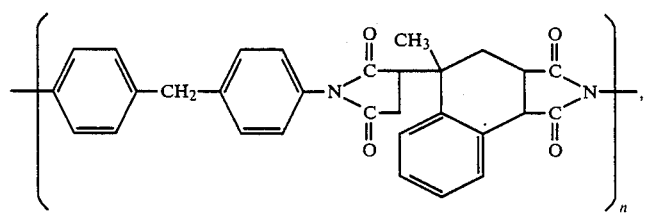

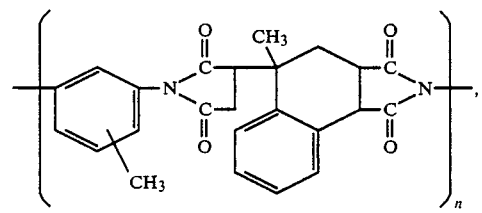

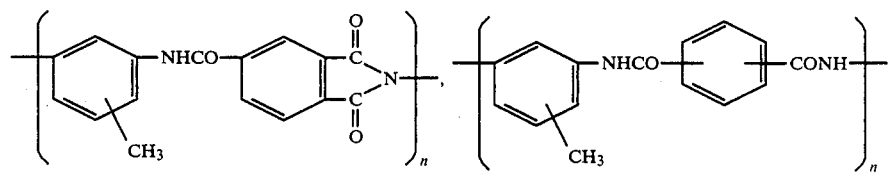

and the like; as well as terminal amine-containing polysiloxanes, terminal amine- or terminal carboxyl-containing butadiene/acrylonitrile copolymers, terminal amine-, terminal hydroxyl- or terminal carboxyl-containing polyisobutylenes,

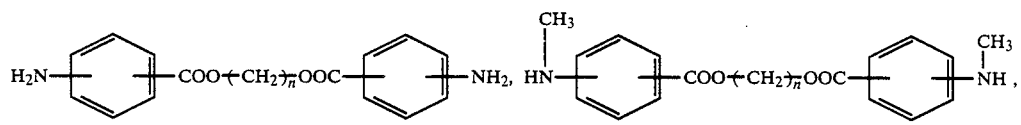

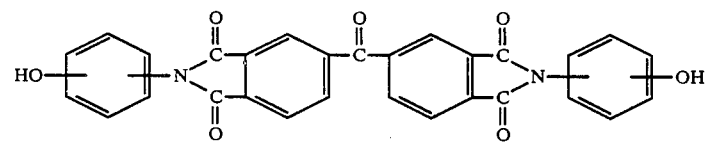

-continued
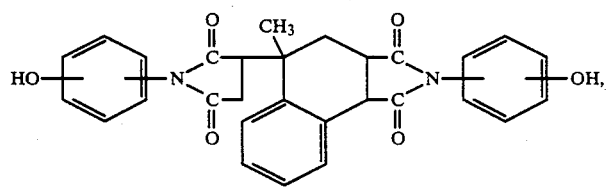
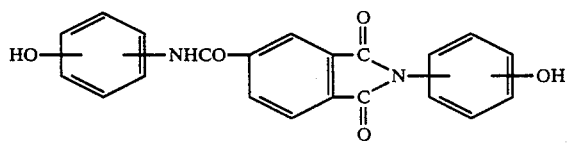
and the like. These reactive oligomers are used either in the form of single substance or in the form of mixture of two or more members.
Examples of said thermoplastic resin include the followings:
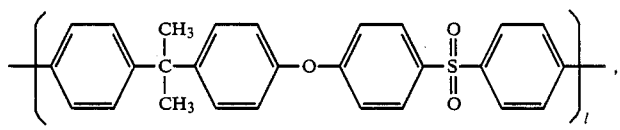
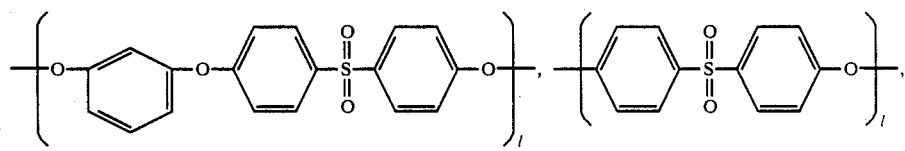
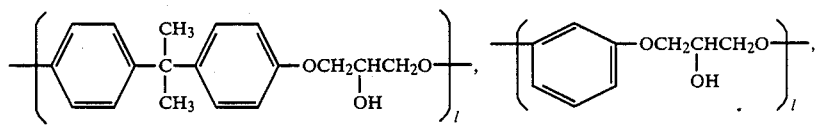
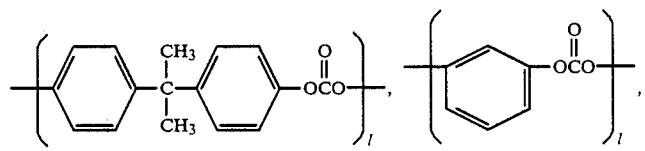
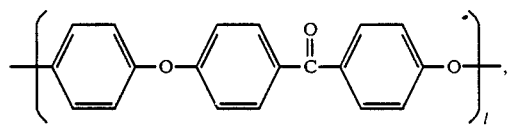
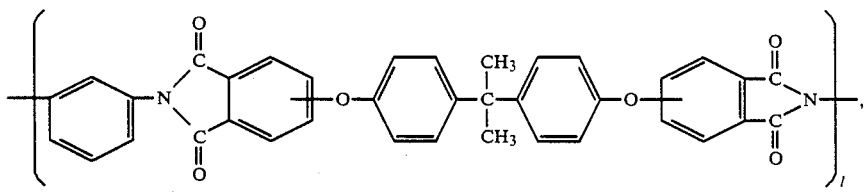

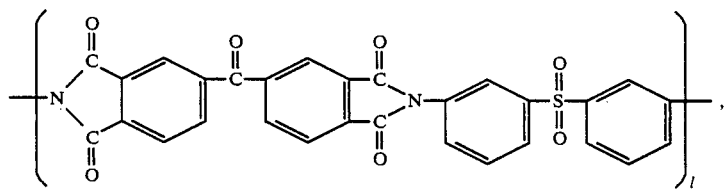

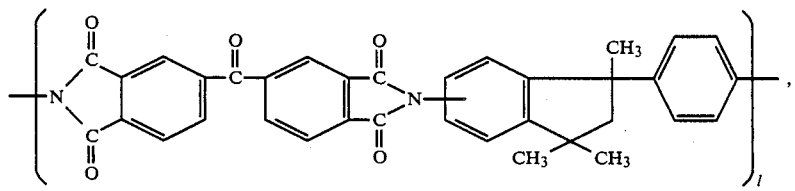

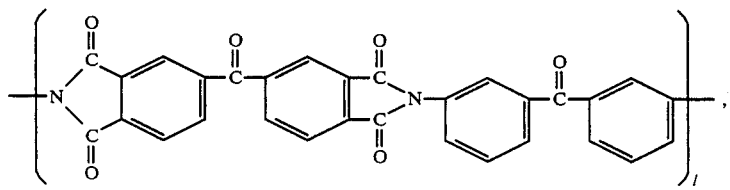

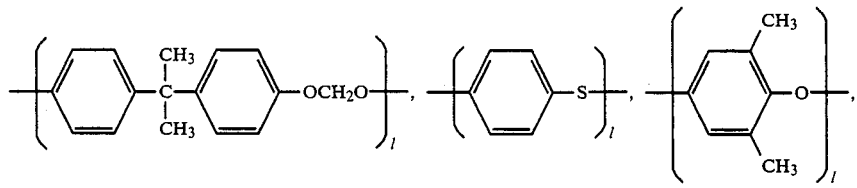

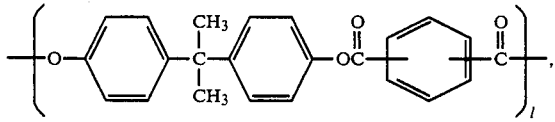

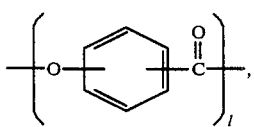

polybutadiene, butadiene/acrylonitrile copolymer, butadiene/acrylonitrile/styrene copolymer, nylon-6,6, nylon-6,12, nylon-6, polyethylene terephthalate, polybutylene terephthalate, polytetramethylene glycol/butanediol/terephthalic acid copolycondensation polyester, polybutyl acrylate, butyl acrylate/methyl methacrylate copolymer, and the like. These thermoplastic resins are used either in the form of single substance or in the form of mixture of two or more.

In the filament winding process, low viscosity of resin is particularly necessary, and the curing agent today usable in this process is limited to special ones such as liquid acid anhydrides, eutectic mixture of diaminodiphenylmethane and m-phenylenediamine, etc. If the low viscosity polyglycidyl derivative of the present invention is used, however, limitation of curing agent is unnecessary and the curing agent can be selected in accordance with the required properties.

As the N,N,N',N',-tetraglycidylbis(aminophenyl)methane and/or its condensation produce as component (B) used in the present invention, commercially available ones such as Sumiepoxy® ELM-434 (manufactured by Sumitomo Chemical Co., Ltd.), Araldite® MY-720 and MY-9512 (manufactured by Ciba Geigy Ltd.), and the like are generally usable. The heat resistance is further improved by using the component (B).

In the present invention, the amount of polyglycidyl derivative of aminophenol represented by the general formula (I) as component (A) to be added to N,N,N',N'-tetraglycidylbis(aminophenyl)-methane and/or its condensation product as component (B) is usually 10 to 50% by weight, preferably 10 to 30% by weight, based on (B). If the amount of (A) exceeds 50% by weight, pot life of resin composition becomes shorter. If the amount of (A) is smaller than 10% by weight, the improving effect on flexibility is small.

As examples of the phenol-novolac type epoxy resin used in the present invention as component (C), those composed mainly of polyfunctional epoxy compounds represented by the following formula:

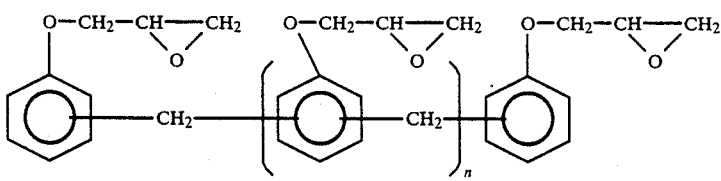

wherein n represents the average degree of polymerization and is a number of 0.5 to 10, can be referred to. Their concrete examples include Sumiepoxy ® ELPN-180 (manufactured by Sumitomo Chemical Co., Ltd.), DEN-431, -438 and -439 (manufactured by Dow Chemical Co.), Epikote ® -152 and -154 (manufactured by Shell Chemical Co.), and the like.

As example of the cresol-novolac type epoxy resin as component (C), those composed mainly of polyfunctional epoxy compounds represented by the following formula:

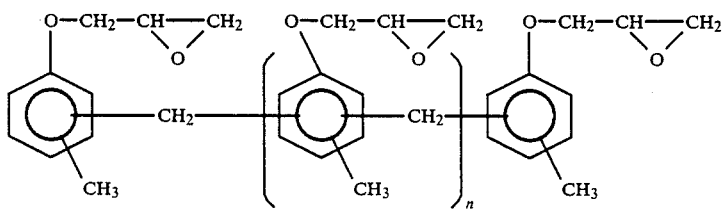

wherein n represents the average degree of polymerization and is a number of 0.5 to 10, can be referred to. Their concrete examples include Sumiepoxy ® ESCN-205L, 220L, 220H, 220HH and 195XL (manufactured by Sumitomo Chemical Co., Ltd.), Araldite ® ECN-1235 and 9511 (manufactured by Dow Chemical Co.), and the like can be referred to.

Next, the Bisphenol A diglycidyl ether type epoxy resins as component (C) are represented by the following formula:

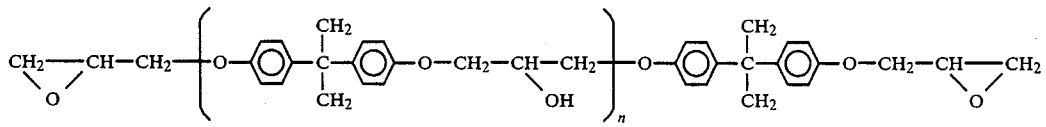

wherein n represents the average degree of polymerization and is a number of 0.1 to 20. Their concrete examples include Sumiepoxy ® ELA-127, ELA-128, ELA-134, ESA-011, -012, -014, -017, -019 (manufactured by Sumitomo Chemical Co., Ltd.), Epikote ® Ep-808, -827, -1001, -1002, -1004, -1007, -1009 (manufactured by Shell Chemical Co., Ltd.), and the like. These epoxy resins may be used either in the form of single resin or in mixture of two or more.

When two or more epoxy resins are used in the form of a mixture, the amount of Bisphenol A diglycidyl ether type epoxy resin is preferably in the range of 0.25 to 1 part by weight per 1 part by weight of the total amount of phenol-novolac type epoxy resin and/or cresol-novolac type epoxy resin.

In the present invention, the preferable compounding ratio between (A), and (C) is as follows. Thus, 5 to 70 parts by weight of component (A) is compounded with 100 parts by weight of component (C). If the amount of component (A) is smaller than 5 parts by weight, low temperature curability cannot be improved greatly. If the amount of component (A) is larger than 70 parts by weight, storage stability is unsatisfactory.

As the epoxy curing agent used in the present invention, any of the conventional curing agents as used for curing epoxy resins can be used. Examples of said epoxy curing agent include dicyandiamide, tetramethylguanidine, phenol-novolac resin, cresol-novolac resin, acid anhydrides, acid hydrazid compounds, aromatic amines, aliphatic amines, alicyclic amines, boron trifluoride complexes, and the like. These curing agents are used alone or in combination of two or more thereof.

Examples of said acid anhydride include one or more members selected from tetrahydrophthalic anhydride, methyltetrahydrophthalic anhydride, hexahydrophthalic anhydride, methylhexahydrophthalic anhydride, dodecenylsuccinic anhydride, nadic anhydride, methylnadic anhydride, phthalic anhydride, pyromellitic anhydride, benzophenonetetracarboxylic acid anhydride, methylcyclohexenetetracarboxylic acid anhydride, 3,4-dicarboxy-1,2,3,4-tetrahydro-1-naphthalenesuccinic acid dianhydride, 1-methyl-3,4-dicarboxy-1,2,3,4-tetrahydro-1-naphthalenesuccinic acid dianhydride, and the like.

Examples of said aromatic amine include at least one or more members selected from 4,4'-diaminodiphenylmethane, 3,3'-diaminodiphenylmethane, 4,4'-diaminodiphenyl ether, 3,4'-diaminodiphenyl ether, 4,4'-diaminodiphenylpropane, 4,4'-diaminodiphenylsulfone, 3,3'-diaminodiphenylsulfone, 2,4-toluenediamine, 2,6-toluenediamine, m-phenylenediamine, p-phenylenediamine, benzidine, 4,4'-diaminodiphenyl sulfide, 3,3'-dichloro-4,4'-diaminodiphenylsulfone, 3,3'-dichloro-4,4'-diaminodiphenylpropane, 3,3'-dimethyl-4,4'-diaminodiphenylmethane, 3,3'-dimethoxy-4,4'-diaminobiphenyl, 3,3'-dimethyl-4,4'-diaminobiphenyl, 1,3-bis(4-aminophenoxy)benzene, 1,3-bis(3-aminophenoxy)-benzene, 1,4-bis(4-aminophenoxy)-benzene 2,2-bis(4-aminophenoxyphenyl)propane, 4,4'-bis(4-aminophenoxy)-diphenylsulfone, 4,4'bis(3-aminophenoxy)diphenylsulfone, 9,9'-bis(4-aminophenyl)anthracene, 9,9'-bis(4-aminophenyl)-fluorene, 3,3'-dicarboxy-4,4'-diaminodiphenylmethane, 2,4-diaminoanisole, bis(3-aminophenyl)-methylphosphine oxide, 3,3'-diaminobenzophenone, o-toluidine sulfone, 4,4'-methylene-bis-o-chloroaniline, tetrachlorodiaminodiphenylmethane, m-xylylenediamine, p-xylylenediamine, 4,4'-diaminostilbene, 5-amino-1-(4'-aminophenyl)-1,3,3-trimethylindane, 6-amino-1-(4'-aminophenyl)-1,3,3-trimethylindane, 5-amino6-methyl-1-(3'-amino-4'-methylphenyl) -1,3,3-trimethylindane, 7-amino-6-methyl-1-(3'-amino-4'-methylphenyl)-1,3,3-trimethylindane, 6-amino-5-methyl-1-(4'-amino-3'-methylphenyl)-1,3,3-trimethylindane, 6-amino-7-methyl-1-(4'-amino-3'-methylphenyl)-1,3,3-trimethylindane,

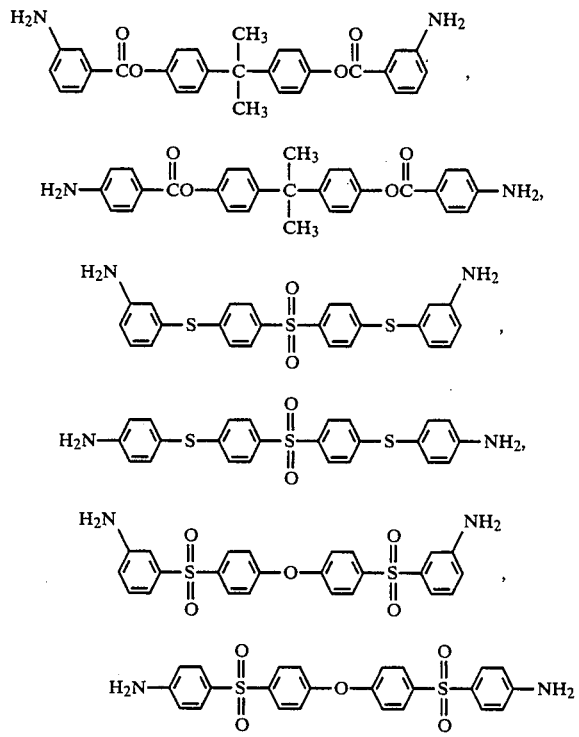

and the like.

Among the above epoxy curing agents (D), dicyandiamide, acid anhydride, acid hydrazid compounds, aromatic amines are preferred.

The amount of epoxy curing agent (D) should be appropriately decided with consideration of the kind of curing agent and the kind of resins to be cured, but in general, the curing agents are used in an amount of 0.7 to 1.2 times the stochiometric amount based on the resins to be cured.

In this case, for example, when the curing agent is dicyandiamide, its amount should be 2 to 9 parts by weight and more preferably 3 to 7 parts by weight per 100 parts by weight of the summed amount of components (A) and (C). When the epoxy curing agent is acid hydrazide, its amount should be 2 to 50 parts by weight. When a curing accelerator is used in addition to epoxy curing agent and the epoxy curing agent is dicyandiamide, the amount of dicyandiamide should be 0.5 to 8 parts by weight and more preferably 1 to 6 parts by weight per 100 parts by weight of the sum of component (A) and (C).

The polyglycidyl derivative of the invention may be used in combination with hitherto known epoxy resins. Particularly when it is used in combination with an epoxy resin having a high viscosity or a solid epoxy resin, it effectively acts as a reactive diluent.

Examples of said hitherto known epoxy resin include one or more members selected from the glycidyl ether compounds derived from dihydric, trihydric or higher-hydric phenols such as Bisphenol A, Bisphenol F, hydroquinone, resorcine, phloroglucin, tris(4-hydroxyphenyl)-methane, 1,1,2,2-tetrakis-(4-hydroxyphenyl)-ethane and the like or halogenated bisphenoles such as tetrabromoBisphenol A and the like; novolac epoxy resins derived from novolac resins which are reaction products between formaldehyde and phenols such as phenol, o-cresol and the like; amine type epoxy resins derived from aniline, p-aminophenol, m-aminophenol, 4,4'-diaminodiphenylmethane, 3,3'-diaminodiphenylmethane, 4,4'-diaminodiphenyl ether, 3,4'-diaminodiphenyl ether, 1,4-bis(4-aminophenoxy)benzene, 1,4-bis(3-aminophenoxy)-benzene, 1,3-bis(4-aminophenoxy)-benzene, 1,3-bis(3-aminophenoxy)-benzene, 2,2-bis(4-aminophenoxyphenyl)-propane, p-phenylenediamine, m-phenylenediamine, 2,4-toluenediamine, 2,6-toluenediamine, p-xylylenediamine, m-xylylenediamine, 1,4-cyclohexane-bis(methylamine), 1,3-cyclohexane-bis(methylamine), 5-amino-(1'-aminophenyl)-1,3,3-trimethylindane, 6-amino-1-(4'-aminophenyl)-1,3,3-trimethylindane and the like; glycidyl ester compounds derived from aromatic carboxylic acids such as p-oxybenzoic acid, m-oxybenzoic acid, terephthalic acid, isophthalic acid and the like; hydantoin type epoxy resins derived from 5,5-dimethylhydantoin and the like; alicyclic epoxy resins such as 2,2'-bis(3,4-epoxycyolohexyl)-propane, 2,2-bis-(4-(2,3-epoxypropyl)cyclohexyl)-propane, vinylcyclohexene dioxide, 3,4-epoxycyclohexylmethyl-3,4-epoxycyclohexanecarboxylate and the like; triglycidyl isocyanurate; 2,4,6-triglycidoxy-s-triazine; and the like.

Further, as curing accelerator, hitherto known tertiary amines, phenolic compounds, imidazoles or Lewis acids may be added, if desired.

Examples of the fiber which can be used as a reinforcing material in the invention include inorganic and organic fibers having a tensile strength of 0.5 GPa or above and a Young's modulus of 50 GPa or above such as carbon fiber, graphite fiber, glass fiber, silicon carbide fiber, alumina fiber, titania fiber, boron nitride fiber, aromatic polyamide fiber, aromatic polyester fiber, polybenzimidazole fiber and the like. These fibers can be used in the form of continuous tow, woven fabric, short fiber, whisker and the like.

For some purpose of the use of the composition, combined use of two or more kinds of fibers or plural fibers different in shape is also possible. Further, combined use of the above-mentioned reinforcing fiber and particulate substances such as talc, mica, calcium carbonate, alumina hydrate, silicon carbide, carbon black, silica and the like is also effective for improving the viscosity of resin composition and thereby facilitating its molding process or for improving the properties, such as compression strength, of the produced composite material.

As the production process of the composite material of the invention, any of the hitherto known production processes of fiber-reinforced composite material using an epoxy resin as matrix can be employed.

As one example of the production process, a process which comprises laminating a plurality of sheetformed prepregs and heating the laminate under elevated pressure in an autoclave to obtain a composite material can be referred to.

As used herein, the term "prepreg" means a product prepared by impregnating a reinforcing fiber with the resin composition, and it can take the form of sheet, continuous tow, strand, yarn and pellet. In the sheet-formed prepreg, the reinforcing fiber takes the form of drawn and oriented continuous tow, a mat made from entanglement of short fiber, or a woven fabric. Further, a laminated sheet-like prepreg formed by superposing a plurality of sheets different in structure and a material prepared by bundling several continuous tow prepregs are also useful.

The content of fiber in these prepregs is preferably 5 to 70% by volume and particularly 10 to 60% by volume.

The prepreg can be produced by impregnating or mixing an assembly of reinforcing material with a resin composition or its partially cured product which has been liquefied by dissolution or melting in accordance with need, followed by optionally heating it to cause a partial cure.

· According to another possible embodiment of the invention, chopped strands, mats or woven cloths of reinforcing fiber are laminated in a mold, impregnated with a resin composition and then thermally cured to give a molded product. The fiber content in these composite materials is usually 5 to 70% by volume. A fiber content of 10 to 60% by volume is particularly preferred from the viewpoint of giving the composite material good properties.

As low-viscosity triglycidyl derivatives (A) of aminophenol represented by the general formula (I) used for composite material of the present invention, there may also be used derivatives having a viscosity of 15 poises or more. However, it is essential to keep the viscosity of polyglycidyl derivatives below 100 poises or less, preferably 50 poises or less, and more preferably 15 poises or less.

According to the method of the present invention, low-viscosity derivatives can be very easily obtained.

Next, referring to the following non-limitative examples, the invention will be explained below more concretely.

EXAMPLE 1

Into a flask equipped with a stirrer, a thermometer, a cooling and separating device and a dropping funnel were charged 185 g (1.5 moles) of 4-amino-m-cresol and 2,082 g (22.5 moles) of epichlorohydrin. After dissolution, the resulting solution was kept at 40° C. for 15 hours. Then, it was heated to 65° C., and 413 g (4.96 moles) of 48% aqueous solution of sodium hydroxide was dropped thereinto over a period of 4 hours while azeotropically distilling off the water in the system under a reduced pressure of 150 mm Hg. Subsequently, the excessive epichlorohydrin was distilled off under final conditions of 70° C. and 5 mm Hg. After the distillation of epichlorohydrin, the resin was dissolved into 900 g of methyl isobutyl ketone, washed with water and filtered to remove the resulting salt and gelationous substance, after which the methyl isobutyl ketone was distilled off under final conditions of 120° C. and 5 mm Hg to obtain a triglycidyl derivative.

It had an epoxy equivalent of 104 g/eq and a viscosity of 9.7 poises at 25° C.

EXAMPLE 2

Into a flask equipped with a stirrer, a thermometer, a cooling and separating device and a dropping funnel were charged 206 g (1.5 moles) of 4-amino-3,5-xylenol and 2,082 g (22.5 moles) of epichlorohydrin. After dissolution, the resulting solution was kept at 40° C. for 48 hours. Then, it was heated to 65° C., and 413 g (4.96 moles) of 48% aqueous solution of sodium hydroxide was dropped thereinto over a period of 4 hours while azeotropically distilling off the water in the system under a reduced pressure of 150 mm Hg. Subsequently, the excessive epichlorohydrin was distilled off under final conditions of 70° C. and 5 mm Hg. After the distillation of epichlorohydrin, the resin was dissolved into 900 g of methyl isobutyl ketone, washed with water and filtered to remove the resulting salt and gelatinous substance, after which the methyl isobutyl ketone was distilled off under final conditions of 120° C. and 5 mm Hg to obtain a triglycidyl derivative.

It had an epoxy equivalent of 113 g/eq and a viscosity of 10.9 poises at 25° C.

COMPARATIVE EXAMPLE 1

A polyglycidyl derivative was produced by repeating the procedure of Example 1, except that 4-amino-m-cresol was replaced with 4-amino-o-cresol.

It had an epoxy equivalent of 119 g/eq and a viscosity of 167 poises at 25° C.

SYNTHESIS EXAMPLE 1

Into a flask equipped with a stirrer, a thermometer and a cooling-separating device were charged 79.9 g (0.578 mole) of powdery potassium carbonate, 116.4 g (0.405 mole) of 4,4-dichlorodiphenylsulfone, 82.6 g (0.362 mole) of Bisphenol A, 132 g of toluene and 302 g of dimethylacetamide. The mixture was heated to 70° C. while blowing 10 liters/hour of nitrogen (the blowing of nitrogen was continued till the reaction was completed). Thirty minutes after, 9.76 g (0.0894 mole) of p-aminophenol was added, and the reaction mixture was heated to continue the reaction while azeotropically distilling off water. The reaction temperature was kept near 160° C., and completion of the reaction took 10 hours. After the reaction, the resulting salt was filtered off and the solvent was partially distilled off, after which the product was precipitated in water/methanol mixture and the precipitate was washed with methanol and dried under reduced pressure to obtain a terminal amine-containing polysulfone oligomer.

Its average molecular weight was 4,320, as revealed by terminal amino group analysis.

SYNTHESIS EXAMPLE 2

Into a flask equipped with a stirrer, a thermometer and a cooling-separating device were charged 66.1 g (0.6 mole) of resorcin, 402 g of dimethyl sulfoxide, 613 g of chlorobenzene and 100 g (1.2 moles) of 48% sodium hydroxide solution. While sufficiently substituting the atmosphere with nitrogen, the mixute was heated to 115° C. An azeotropic dehydration was started at 115° C., and it was continued up to a temperature of 140° C. After completion of the azeotropic dehydration, the temperature was further elevated to 160° C. to distil off the chlorobenzene.

After distillation of chlorobenzene, the temperature was once lowered to 50° C. or below, and at this temperature 161 g (0.56 mole) of 4,4'-dichlorodiphenylsulfone was charged. Then, the temperature was again elevated to 160° C., and at this temperature a polymerization reaction was carried out for 3 hours. After completion of the polymerization reaction, the reaction mixture was cooled to 100° C., the excessive sodium hydroxide was neutralized with hydrochloric acid, and then the product was precipitated in water, washed with water and dried under reduced pressure to obtain a terminal hydroxyl group-containing polysulfone oligomer. Its average molecular weight was 4,700, as revealed by the analysis of terminal hydroxyl group.

EXAMPLE 3

The polyglycidyl derivatives of Examples 1 and Sumiepoxy ELM-434*, and the reactive oligomers of Synthesis Example 1 was compounded according to the formulation shown in Table 1. After making homogeneous solutions, their viscosities were measured. As the result, it was found that A had low viscosities enough to form into a prepreg in combination with carbon fiber. From composition (C) (comparative example), no prepreg could be prepared, because of its high viscosity.

TABLE 1

| | | (parts by weight) | |
|---|---|---|---|
| | | A | C (Comparative example) |
| Epoxy resin | Example 1 | 100 | — |
| | Sumiepoxy ELM-434* | — | 100 |
| Oligomer | Synthesis Example 1 | 80 | 80 |
| 4,4'-Diaminodiphenylsulfone | | 50 | 45 |
| Viscosity (poise/150° C.) | | 35 | >1,000 |

*Tetraglycidyl derivative of 4,4'-diamino-diphenyl-methane manufactured by Sumitomo Chemical Co., Ltd.

EXAMPLE 4

Using the resin compositions A of Example 3 as matrix, one-directionally reinforced composite materials containing 60% by volume of carbon fiber were prepared. Characteristic properties of the carbon fiber were as follows: tensile strength=420 kgf/mm², elastic modulus=24,000 kgf/mm², elongation at break=1.8%. The curing conditions were as follows: pressing at 180° C., 30 atm. for 2 hours; post-cure at 200° C. for 4 hours. Properties of the composite materials thus obtained, named D, were as shown in Table 2.

TABLE 2

| | | D |
|---|---|---|
| Tensile strength | kg/mm² | 241 |
| Tensile modulus | " | 13,500 |
| Tensile elongation | % | 1.8 |
| Bending strength | kg/mm² | 235 |
| Bending modulus | " | 13,100 |
| $G_{1C}$ | KJ/m² | 0.74 |
| Izod impact strength | " | 210 |

Note:
$G_{1C}$ (Critical strain energy release rate) measured according to NASA RP 1092-83
Tensile characteristics: measured according to ASTM D-3039

EXAMPLE 5

According to the formulation shown in Table 1, the triglycidyl derivatives of Examples 1 and 2, Sumiepoxy ELM-120 (manufactured by Sumitomo Chemical Co., Ltd., epoxy equivalent 122 g/eq) and Sumiepoxy ELPN-180 (manufactured by Sumitomo Chemical Co., Ltd., epoxy equivalent 181 g/eq) were compounded and made into homogeneous solutions at about 120° C. After immediately removing the bubbles under reduced pressure, viscosities of the compositions were measured. Then, the compositions were heated and cured first at 120° C. for 2 hours and subsequently at 180° C. for 5 hours and properties of the cured products were measured. The results were as shown in Table 3.

TABLE 3

| Kind of epoxy resin | Example 1 | Example 2 | ELM-120 | ELPN-180 |
|---|---|---|---|---|
| Amount of epoxy resin | 100 | 100 | 100 | 100 |
| 4,4'-Diaminodiphenylsulfone | 58 | 55 | 50 | 34 |
| BF₃-MEA*¹ | 0.58 | 0.55 | 0.5 | 0.34 |
| Viscosity of epoxy resin composition (CP/120° C.) | 50 | — | 190 | 280 |
| Tg*² (°C.) | 265 | 263 | 220 | 208 |
| Bending strength*³ (kg/mm²) | 19.6 | 17.2 | 16.0 | 15.3 |
| Bending modulus*³ (kg/mm²) | 442 | 380 | 400 | 351 |
| Deflection in bending*³ | 0.068 | 0.054 | 0.040 | 0.061 |
| Water absorption (boiling for 48 hrs)*³ (%) | 5.8 | 5.0 | 6.8 | 5.0 |

Notes:
*¹Boron trifluoride-monoethylamine complex
*²TMA method
*³JIS K-6911

EXAMPLE 6

An insulating coating material was prepared by compounding 100 parts of the triglycidyl derivative of Example 1, 145 parts of methyltetrahydrophthalic anhydride, 0.2 part of 2-ethyl-4-methylimidazole and 735 parts of alumina (ALM-43 manufactured by Sumitomo Aluminum K.K.) and uniformly homogenizing them with a triple roll. It could be easily coated on printed circuit board or the like by the use of an applicator. It was poured into a mold and cured first at 120° C. for 60 minute, then at 160° C. for 60 minutes and further at 200° C. for 30 minutes. Properties of the molded product were measured according to JIS-K-6911. The results were as listed in Table 4.

COMPARATIVE EXAMPLE 2

A composition was prepared according to the same formulation as in Example 6, except that the triglycidyl derivative of Example 1 was replaced with Sumiepoxy ELM-120. Thus, according to the formulation shown in Table 4, a composition was prepared and homogenized by the use of a triple roll. However, no flowable compounded mixture could be obtained because of the high viscosity of the resin. Accordingly, it was difficult to handle as an insulating coating material.

TABLE 4

|  | Example 6 | Comparative Example 2 |
|---|---|---|
| Epoxy resin of Example 1 | 100 | — |
| ELM-120 | — | 100 |
| Methyltetrahydrophthalic anhydride | 145 | 124 |
| 2-Ethyl-4-methylimidazole | 0.2 | 0.2 |
| Alumina | 735 | 672 |
| HDT (°C.) | 183 | Unmeasurable because of the poor workability of the coating material |
| Barcol hardness | 78 | |
| Water absorption (boiling for 2 hrs) (%) | 0.16 | |
| Volume resistivity (Ω-cm) | $2.2 \times 10^{16}$ | |

EXAMPLE 7

The epoxy resins (produced under the same condition as in Example 1) and curing agents shown in Table 5 were compounded according to the formulation shown in Table 5 to prepare methyl ethyl ketone solutions having a solid content of 60% by weight. A carbon fiber (Magnamite ® AS-4, manufactured by Hercules Inc.) was continuously impregnated into each of the solutions thus obtained and then it was wound up on a drum coated with a silicone release paper. The amount of the adherent resin solution was regulated by passing the impregnated carbon fiber through two stainless steel rods having a controlled distance.

The carbon fiber impregnated with the resin solution and wound on the release paper was cut open and withdrawn and then placed in an hot air oven at 120° C. for about 10 minutes to prepare a dry prepreg.

After being squeezed out of the carbon fiber prepreg, all the epoxy resin compositions of the invention, i.e. resin compositions composed of triglycidyl-4-amino-m-cresol and diaminodiphenylsulfone (hereinafter, simply referred to as DDS), had as low a viscosity as 10 poises or below at 5020 C. The pot life (workable time) of resin composition was longer than 1 hour at 100° C.

The content of carbon fiber in the prepregs was regulated so as to become 55% by volume.

Each of the prepregs thus obtained was charged into a matched die so that the content of carbon fiber came to 60% by volume after being molded, and it was heated and molded under pressure for one hour by means of a hot press heated to a predetermined temperature. The molded product thus obtained was further post-cured in a hot air circulation type oven under a predetermined condition. Thereafter, interlaminar shear strength and bending strength of the molded product were measured according to ASTM D-2344 and ASTM D-790. The results were as shown in Table 5.

EXAMPLE 8

Carbon fiber-reinforced composite materials were prepared by repeating the procedure of Example 7, except that 4,4'-diaminodiphenylsulfone shown in Table 6 were used in the amounts shown in Table 6. Properties of the composite materials thus obtained were measured to obtain the results shown in Table 6

EXAMPLE 9

Molded products of carbon fiber-reinforced composite materials were prepared by repeating the procedure of Example 8, except that 4,4'-diaminidiphenylsulfone were used. The molded products thus obtained were dipped in boiling water for 48 hours, and then their properties were measured. The results were as shown in Table 7.

TABLE 5

| | | Curing agent | | Molding conditions | | | | Properties of molded product | | Inter-laminar shear strength (kg/mm$^2$) |
|---|---|---|---|---|---|---|---|---|---|---|
| | | | | In die | | Post-cure | | Bending | | |
| No. | Resin | Kind | Amount (PHR) | Temp. (°C.) | Time (hr) | Temp. (°C.) | Time (hr) | Strength (kg/mm$^2$) | Modulus (ton/mm$^2$) | |
| Experiment 1 | Triglycidyl-4-amino- | 4,4'-DDM | 47 | 130 | 1 | 150 | 4 | 175 | 12.1 | 11.1 |
| Experiment 2 | m-cresol | 4,4'-DDS | 59 | 150 | " | 180 | 4 | 200 | 12.3 | 13.3 |
| Experiment 3 | (Epoxy value 105) | 3,3'-DDS | 59 | 150 | " | 180 | 2 | 204 | 12.3 | 13.5 |
| Experiment 4 | (The same resin was | BF$_3$.MEA | 5 | 150 | " | 160 | 4 | 172 | 12.2 | 9.4 |
| Experiment 5 | used in Experiments 1-5.) | 2E4MZ | 3 | 120 | " | 140 | 4 | 174 | 12.0 | 9.5 |
| Comparative Example 3 | Sumiepoxy ® ELM-120*$^1$ (manfd. by Sumitomo Chemical Co., Ltd.) | 4,4'-DDM | 41 | 150 | " | 160 | 4 | 174 | 12.2 | 9.6 |
| Comparative Example 4 | (Epoxy value 120) | 4,4'-DDS | 52 | 170 | " | 190 | 4 | 191 | 12.4 | 12.5 |
| Comparative Example 5 | (The same resin was used in Comp. Examples 3-7.) | 3,3'-DDS | 52 | 170 | " | 190 | 2 | 193 | 12.4 | 12.7 |
| Comparative Example 6 | | BF$_3$.MEA | 5 | 150 | " | 160 | 4 | 170 | 12.1 | 8.9 |
| Comparative Example 7 | | 2E4MZ | 3 | 120 | " | 140 | 4 | 171 | 12.0 | 9.0 |

Notes:
BF$_3$.MEA: Boron trifluoride-monoethylamine complex;
2E4MZ: 2-Ethyl-4-methylimidazole;
DDM: Diaminodiphenylmethane;
DDS: Diaminodiphenylsulfone
*$^1$Triglycidylaminophenyl

TABLE 6

| No. | Resin | 4,4'-Diamino-diphenylsulfone (DDS) Amount (PHR) | 4,4'-Diamino-diphenylsulfone (DDS) Molar ratio*1 | Bending strength (kg/mm²) | Interlaminar shear strength (kg/mm²) | Heat distortion temperature of molded product (°C.) |
| --- | --- | --- | --- | --- | --- | --- |
| Experiment 6 | Triglycidyl-4-amino-m-cresol (same as used in Example 7) (The same*2 resin was used in Exp. 6-10.) | 23.6 | 0.4 | 190 | 13.1 | 265 |
| Experiment 7 | | 35.4 | 0.6 | 210 | 13.5 | 275 |
| Experiment 8 | | 47.2 | 0.8 | 215 | 13.6 | 275 |
| Experiment 9 | | 59.0 | 1.0 | 200 | 13.3 | 275 |
| Experiment 10 | | 82.7 | 1.4 | 194 | 13.1 | 270 |
| Comparative Example 8 | Sumiepoxy ®*3 ELM-120 (manufd. by Sumitomo Chem. Co., Ltd.) (The same resin was used in Comp. Exp. 8-12.) | 20.8 | 0.4 | 170 | 11.9 | 183 |
| Comparative Example 9 | | 31.2 | 0.6 | 184 | 12.4 | 200 |
| Comparative Example 10 | | 41.6 | 0.8 | 193 | 12.6 | 212 |
| Comparative Example 11 | | 52.0 | 1.0 | 191 | 12.5 | 212 |
| Comparative Example 12 | | 72.8 | 1.4 | 172 | 12.0 | 200 |

*1 Theoretical value calculated from the quantities of epoxy group and amino group is taken as unity.
*2 Molding conditions: In die 150° C. × 1 hr; Post-cure 180° C. × 4 hrs; Cure of resin only 180° C. × 4 hrs.
*3 Molding conditions: In die 170° C. × 1 hr; Post-cure 190° C. × 4 hrs; Cure of resin only 190° C. × 4 hrs.

TABLE 7

| No. | Epoxy resin | 4,4'-Diaminodiphenylsulfone Amount (PHR) | 4,4'-Diaminodiphenylsulfone Molar*1 ratio | Bending strength after 48 hrs. in boiling water (kg/mm²) | Interlaminar Shear strength after 48 hrs. in boiling water (kg/mm²) |
| --- | --- | --- | --- | --- | --- |
| Experiment 11 | Triglycidyl-4-amino-m-cresol (same as used in Example 7) | 47.2 | 0.8 | 205 | 11.6 |
| Comparative Example 13 | Sumiepoxy ® ELM-120 (manufd. by Sumitomo Chemical Co., Ltd.) | 41.6 | 0.8 | 170 | 8.3 |

*1 Theoretical value calculated from the quantities of epoxy group and amino group is taken as unity.

EXAMPLE 10

A mixture consisting of 200 parts by weight of triglycidyl-4-amino-m-cresol (same as used in Example 7) and 94.4 parts by weight of 4,4'-diaminodiphenylsulfone was stirred at 100° C. for 30 minutes, As the result, the 4,4'-diaminodiphenylsulfone was completely dissolved, and a uniform liquid composition was obtained.

The resin composition was a viscous liquid at room temperature. Its viscosity measured at 100° C. with cone plate viscometer was 10 poises or below, and its pot life (workable time) was longer than 1hour at 100° C. The composition thus obtained was used for filament winding process.

While keeping the liquid resin composition at 100° C., the same carbon fiber as in Example 5 was continuously impregnated with the resin composition and wound up on a cylindrical mandrel sufficiently coated with a mold release agent, according to the filament winding process. The angle of winding was regulated so as to make 90° with the mandrel axis. The tubular product thus formed composed of the resin-impregnated carbon fiber and the mandrel was cured for 4 hours, while continuously rotating it in an oven kept at 180° C. After slowly cooling the cured product, the mandrel was withdrawn. Thus, a fiber-reinforced tubular product was obtained.

The cured product thus obtained was cut into pieces, and the cut surface was examined by means of scanning electron microscope to confirm the absence of air bubbles. The content of carbon fiber was 58% by volume. The tubular product was cut perpendicularly with regard to the mandrel axis and tested according to NOL-ring method. The results were as shown in Table 8.

The NOL ring tensile strength was measured according to ASTM D-2290.

TABLE 8

| | 25° C. | 180° C. |
| --- | --- | --- |
| Tensile strength (kg/mm²) | 210 | 160 |
| Tensile modulus (t/mm²) | 13.0 | 12.6 |

EXAMPLE 11

A matrix resin composition was prepared by dissolving 800 g of N,N,N',N'-tetraglycidylbis(aminophenyl)-methane (Sumiepoxy ® ELM-434, manufactured by Sumitomo Chemical Co., Ltd., epoxy equivalent 120), 200 g of triglycidyl-4-amino-m-cresol (same as used in Example 7) and 425 g of 4,4'-diaminodiphenylsulfone into 1,450 g of methyl ethyl ketone. Then, a carbon fiber (Magnamite ® AS-4, manufactured by Hercules Inc.) was drawn and arranged in one direction and then impregnated with the above-mentioned resin solution. Then, it was dried at 120° C. for 5 minutes to prepare a prepreg.

The epoxy resin composition squeezed out of this carbon fiber prepreg had a low viscosity of 10.5 poises or below at 50° C. The resin composition was cured for 4 hours at 180° C., and the cured product had a Tg of 265° C.

The content of carbon fiber in the prepreg was regulated so as to become 55% by volume.

The prepreg thus obtained was charged into a matched die so that its carbon fiber content came to 60% by volume after molding, and it was heated and molded under elevated pressure for one hour in a hot press heated to 160° C. The molded product thus obtained was further post-cured in a hot air circulation type oven at 180° C. for 4 hours to complete its cure. Thus, a molded product of one-directionally reinforced carbon fiber-reinforced composite material (CFRP plate) having a thickness of 2 mm was obtained.

The molded product had a heat distortion temperature of 260° C. Then, bending strength and ILSS of the CFRP thus obtained were measured according to ASTM D-790 and ASTM D-2344, respectively. The results were as shown in Table 9.

TABLE 9

| Item of measurement | Temperature of measurement | 20° C. | 150° C. | 180° C. |
| --- | --- | --- | --- | --- |
| Bending (0° from fiber axis) | Strength (kg/mm$^2$) | 210 | 170 | 158 |
| | Modulus (t/mm$^2$) | 12.6 | 12.5 | 12.3 |
| Bending (90° from fiber axis) | Strength (kg/mm$^2$) | 14.5 | 12.2 | 11.0 |
| | Modulus (t/mm$^2$) | 1.01 | 0.99 | 0.97 |
| ILSS (kg/mm$^2$) | | 13.6 | 9.0 | 8.0 |

COMPARATIVE EXAMPLE 14

A matrix resin composition was prepared by dissolving 1,000 g of N,N,N',N'-tetraglycidylbis(aminophenyl)-methane (Sumiepoxy ® ELM-434, manufactured by Sumitomo Chemical Co., Ltd., epoxy equivalent 120) and 413 g of 4,4'-diaminodiphenylsulfone into 1,450 g of methyl ethyl ketone. Thereafter, the procedure of Example 11 was repeated to prepare a prepreg. The prepreg was press-molded at 170° C. for one hour and then postcured at 180° C. for 4 hours to complete its cure. Thus, a molded product of one-directionally reinforced carbon fiber-reinforced composite material (CFRP plate) having a thickness of 2 mm was obtained.

The molded product had a heat distortion temperature of 245° C. Bending strength and ILSS of the CFRP plate thus obtained were measured under the same conditions as in Example 11. The results were as shown in Table 10.

TABLE 10

| Item of measurement | Temperature of measurement | 20° C. | 150° C. | 180° C. |
| --- | --- | --- | --- | --- |
| Bending (0° from fiber axis) | Strength (kg/mm$^2$) | 191 | 153 | 140 |
| | Modulus (t/mm$^2$) | 12.4 | 12.2 | 12.1 |
| Bending (90° from fiber axis) | Strength (kg/mm$^2$) | 11.0 | 9.0 | 8.2 |
| | Modulus (t/mm$^2$) | 1.00 | 0.99 | 0.98 |
| ILSS (kg/mm$^2$) | | 11.7 | 7.9 | 6.3 |

COMPARATIVE EXAMPLE 15

A matrix resin composition was prepared by dissolving 800 g of N,N,N',N'-tetraglycidylbis(aminophenyl)-methane (Sumiepoxy ® ELM-434, manufactured by Sumitomo Chemical Co., Ltd., epoxy equivalent 120), 200 g of Sumiepoxy ® ELM-120 (manufactured by Sumitomo Chemical Co., Ltd., epoxy equivalent 120) and 413 g of 4,4'-diaminodiphenylsulfone into 1,450 g of methyl ethyl ketone. Then, in the same manner as in Example 11, a prepreg was prepared and the prepreg was press-molded at 170° C. for one hour and post-cured at 180° C. for 4 hours to complete its cure. Thus, a molded product of one-directionally reinforced carbon fiber-reinforced composite material (CFRP plate) was obtained.

The molded product had a heat distortion temperature of 230° C. Then, its bending strength and ILSS were measured under the same conditions as in Example 11. The results were as shown in Table 11.

TABLE 11

| Item of measurement | | Temperature of measurement | | |
| --- | --- | --- | --- | --- |
| | | 20° C. | 150° C. | 180° C. |
| Bending (0° from fiber axis) | Strength (kg/mm$^2$) | 200 | 148 | 137 |
| | Modulus (t/mm$^2$) | 12.8 | 12.6 | 12.1 |
| Bending (90° from fiber axis) | Strength (kg/mm$^2$) | 13.3 | 11.1 | 9.8 |
| | Modulus (t/mm$^2$) | 1.03 | 0.95 | 0.90 |
| ILSS (kg/mm$^2$) | | 12.5 | 8.2 | 6.4 |

EXAMPLE 12

An epoxy resin composition for prepreg was prepared by thoroughly stirring 60 parts by weight of Sumiepoxy ® ELPN-180 (manufactured by Sumitomo Chemical Co., Ltd.), 40 parts by weight of 1:1 mixture of ELA-128 and ESA-019 and 15 parts by weight of triglycidyl-4-amino-m-cresol (same as used in Example 7) in a hot kneader, followed by adding 7 parts by weight of dicyandiamide and parts by weight of dichlorophenyl-1,1-dimethylurea thereto, and thoroughly stirring and homogenizing the mixture.

The resin composition thus obtained showed a good fluidity. It formed a gel in 7 minutes at 120° C. The resin composition was cured for 2 hours at 130° C. and the cured product had a Tg of 180° C.

Then, a carbon fiber (Magnamite ® AS-4, manufactured by Hercules Inc.) drawn and arranged in one direction was impregnated with a heated and melted product of the above-mentioned resin composition to obtain a one-directional prepreg. The prepreg thus obtained had appropriate tackiness and flexibility.

When stored at 20° C. for a month, this prepreg showed only slight changes in tackiness and flexibility, demonstrating its excellent storage stability.

EXAMPLE 13

The prepreg obtained in Example 12 was charged into a matched die so that its carbon fiber content came to 60% by volume after molding, and it was pressed and cured in a press heated to 120° C. for a period of 60 minutes under a pressure of 7 kg/cm$^2$. Then, it was after-cured for 2 hours in an over kept at 130° C. to complete its cure. Thus, a one-directionally reinforced carbon fiber-reinforced composite material (CFRP plate) having a thickness of 2 mm was obtained. Bending strength and ILSS of the CFRP plate thus obtained were measured according to ASTM D-790 and ASTM D-2344, respectively. The results were as shown in Table 12.

TABLE 12

| Item of measurement | Temperature of measurement | 20° C. | 100° C. |
|---|---|---|---|
| Bending (0° from fiber axis) | Strength (kg/mm$^2$) | 210 | 190 |
| | Modulus (t/mm$^2$) | 12.8 | 12.5 |
| Bending (90° from fiber axis) | Strength (kg/mm$^2$) | 10.5 | 8.9 |
| | Modulus (t/mm$^2$) | 0.93 | 0.90 |
| ILSS (kg/mm$^2$) | | 11.2 | 8.9 |

COMPARATIVE EXAMPLE 16

In place of the epoxy resins used in Example 12, 20 parts by weight of ELPN-180, 20 parts by weight of ELA-128 and 20 parts by weight of ESA-019 were thoroughly stirred in hot kneader. Then, 7 parts by weight of dicyandiamide and 5 parts by weight of dichlorophenyl-1,1-dimethylurea were added, and the mixture was treated in the same manner as in Example 12 to obtain a one-directionally reinforced carbon fiber prepreg. The prepreg thus obtained was comparable to that of Example 12 in tackiness and flexibility. Its storage stability was as good as 1.5 months at 20° C. However, its optimum curing temperature was so high that its thermal cure took 60 minutes at 140° C.

Next, the prepreg was after-cured for 2 hours in an oven kept at 150° C. to complete its cure. Thus, a one-directionally reinforced carbon fiber-reinforced composite material (CFRP plate) having a thickness of 2 mm was obtained.

Its bending strength and ILSS were measured in the same manner as in Example 13 to obtain the results shown in Table 13.

TABLE 13

| Item of measurement | Temperature of measurement | 20° C. | 100° C. |
|---|---|---|---|
| Bending (0° from fiber axis) | Strength (kg/mm$^2$) | 190 | 175 |
| | Modulus (t/mm$^2$) | 12.5 | 12.3 |
| Bending (90° from fiber axis) | Strength (kg/mm$^2$) | 9.1 | 7.7 |
| | Modulus (t/mm$^2$) | 0.92 | 0.89 |
| ILSS (kg/mm$^2$) | | 9.0 | 7.1 |

COMPARATIVE EXAMPLE 17

In place of the epoxy resins used in Example 12, 100 parts by weight of ELPN-180 only was used. After adding 7 parts by weight of dicyandiamide and 5 parts by weight of dichlorophenyl-1,1-dimethylurea, the mixture was treated in the same manner as in Example 12 to prepare an epoxy resin composition for prepreg. Then, it was molded under the same conditions as in Comparative Example 14 to obtain a one-directionally reinforced carbon fiber-reinforced composite material (CFRP plate) having a thickness of 2 mm.

Bending strength and ILSS of the CFRP plate thus obtained were measured in the same manner as in Example 13 to obtain the results shown in Table 14.

TABLE 14

| Item of measurement | Temperature of measurement | 20° C. | 100° C. |
|---|---|---|---|
| Bending (0° from fiber axis) | Strength (kg/mm$^2$) | 176 | 168 |
| | Modulus (t/mm$^2$) | 12.6 | 12.5 |
| Bending (90° from fiber axis) | Strength (kg/mm$^2$) | 8.1 | 7.3 |
| | Modulus (t/mm$^2$) | 0.93 | 0.91 |
| ILSS (kg/mm$^2$) | | 7.9 | 6.6 |

COMPARATIVE EXAMPLE 18

An epoxy resin composition for prepreg was prepared under the same conditions as in Example 12, except that 60 parts by weight of ELPN-180, 40 parts by weight of 1:1 mixture of ELA-128 and ESA-019 and 15 parts by weight of ELM-120 were used in place of the epoxy resins used in Example 12. Then, the composition was molded under the same conditions as in Comparative Example 15 to obtain a one-directionally reinforced carbon fiber-reinforced composite material (CFRP plate) having a thickness of 2 mm. Its bending strength and ILSS were measured in the same manner as in Example 13 to obtain the results shown in Table 15.

TABLE 15

| Item of measurement | Temperature of measurement | 20° C. | 100° C. |
|---|---|---|---|
| Bending (0° from fiber axis) | Strength (kg/mm$^2$) | 200 | 182 |
| | Modulus (t/mm$^2$) | 13.0 | 12.8 |
| Bending (90° from fiber axis) | Strength (kg/mm$^2$) | 9.6 | 8.1 |
| | Modulus (t/mm$^2$) | 0.95 | 0.92 |
| ILSS (kg/mm$^2$) | | 10.5 | 8.1 |

What is claimed is:

1. A method for producing an epoxy resin composition which comprises reacting an aminophenol represented by the general formula

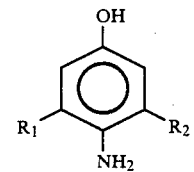

wherein R$_1$ represents a hydrogen atom or an alkyl group of 1 to 4 carbon atoms, and R$_2$ represents an alkyl group of 1 to 4 carbon atoms, with an eiphalohydrin to form an epoxy resin and mixing the epoxy resin with a curing agent.

2. A method according to claim 1, wherein the aminophenol is 4-amino-m-cresol.

3. A method according to claim 1, wherein the epihalohydrin is epichlorohydrin.

4. A method according to claim 1, wherein the amount of epihalohydrin is 3 or more per 1 mole of the aminophenol.

5. A method according to claim 1, wherein as at least one part of the curing agent, a reactive oligomer having a functional group capable of reacting with an epoxy group is used.

6. A method for producing an epoxy resin composition which comprises reacting an aminophenol represented by the general formula

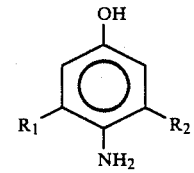

wherein R$_1$ and R$_2$ are as defined above, with an epihalohydrin to form an epoxy resin, and mixing the epoxy resin, with a curing agent and a thermoplastic resin.

7. A method according to claim 6, wherein the aminophenol is 4-amino-m-cresol.

8. A method according to claim 6, wherein the epihalohydrin is epichlorohydrin.

9. A method according to claim 6, wherein the amount of epihalohydrin is 3 or more per 1 mole of the aminophenol.

10. A method according to claim 6, wherein as at least one part of the curing agent, a reactive oligomer having a functional group capable of reacting with an epoxy group is used.

11. An epoxy resin composition comprising an epoxy resin obtained by reacting an aminophenol represented by the general formula

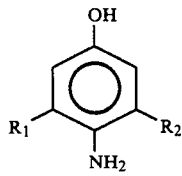

wherein $R_1$ and $R_2$ are as defined above, with an epihalohydrin and a curing agent.

12. An epoxy resin composition according to claim 11, wherein the aminophenol is 4-amino-m-cresol.

13. An epoxy resin composition according to claim 11, wherein the epihalohydrin is epichlorohydrin.

14. An epoxy resin composition according to claim 11, wherein the amount of epihalohydrin is 3 or more per 1 mole of the aminophenol.

15. An epoxy resin composition according to claim 11, which contains a reactive oligomer as at least one portion of the curing agent.

16. An epoxy resin composition comprising an epoxy resin obtained by reacting an aminophenol represented by the general formula

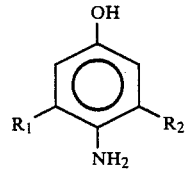

wherein $R_1$ and $R_2$ are as defined above, with an epihalohydrin, a curing agent and a thermoplastic resin.

17. An epoxy resin according to claim 16, wherein the aminophenol is 4-amino-m-cresol.

18. An epoxy resin according to claim 16, wherein the epihalohydrin is epichlorohydrin.

19. An epoxy resin according to claim 16, wherein the amount of epihalohydrin is 3 or more per 1 mole of the aminophenol.

20. An epoxy resin composition according to claim 16, which contains a reactive oligomer as at least one portion of the curing agent.

21. A fiber-reinforced composite material which comprises a cured product of an epoxy resin composition containing, as its indispensable components, a polyglycidyl derivative of an amiophenol represented by the general formula

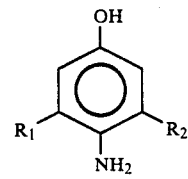

wherein $R_1$ and $R_2$ are as defined above, a curing agent as matrix and a fiber as reinforcing material.

22. A fiber-reinforced composite material according to claim 21, wherein said epoxy curing agent is a diaminodiphenylsulfone compound and/or a diaminodiphenylmethane compound.

23. A heat-resistance composite material which comprises a cured product of an epoxy resin composition comprising, as its indispensable components, (A) a polyglycidyl derivative of an aminophenol represented by the general formula

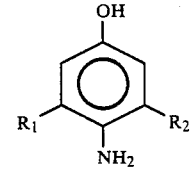

wherein $R_1$ and $R_2$ are as defined above, (B) N,N,N',N'-tetraglycidylbis(aminophenyl)-methane and/or its condensation product, and (D) an epoxy curing agent as matrix and a fiber as reinforcing material.

24. A heat-resistant composite material according to claim 23, wherein said epoxy curing agent is a diaminodiphenylsulfone compound and/or a diaminodiphenylmethane compound.

25. A fiber-reinforced composite material which comprises a cured product of an epoxy resin composition comprising, as its indispensable components, (A) a plyglycidyl derivative of an aminophenol represented by the general formula

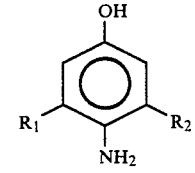

wherein $R_1$ and $R_2$ are as defined above, (C) phenol novolac epoxy resin, cresol novolac epoxy resin and/or Bisphenol A diglycidyl ether epoxy resin, and (D) an epoxy curing agent as matrix and a fiber as reinforcing material.

26. A fiber-reinforced composite material according to claim 25, wherein said epoxy curing agent is dicyandiamide.

* * * * *